United States Patent [19]
De Groot

[11] Patent Number: 5,924,830
[45] Date of Patent: *Jul. 20, 1999

[54] NAIL ELEMENT AND METHOD FOR ITS MANUFACTURE

[76] Inventor: Klaas Willem De Groot, Multatulistraat 1, 3221 TP Hellevoetsluis, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/380,661

[22] Filed: Jan. 30, 1995

Related U.S. Application Data

[62] Division of application No. 08/045,875, Apr. 15, 1993, Pat. No. 5,391,114.

[51] Int. Cl.⁶ ..................................................... F16B 15/00
[52] U.S. Cl. .......................................... 411/458; 411/921
[58] Field of Search ..................................... 411/442, 443, 411/457–461, 921; 52/712

[56] References Cited

U.S. PATENT DOCUMENTS

| | | | |
|---|---|---|---|
| 1,511,711 | 10/1924 | Atwell | 411/475 |
| 2,290,855 | 7/1942 | Myer | 411/460 |
| 3,438,161 | 4/1969 | Koch | 411/460 |
| 3,466,967 | 9/1969 | Hallock | 85/11 |
| 3,950,816 | 4/1976 | Hill | 16/16 |
| 3,981,051 | 9/1976 | Brumlik | 411/921 |
| 4,031,802 | 6/1977 | Hallock | 85/11 |
| 4,159,413 | 6/1979 | Rosenstock et al. | 219/80 |
| 4,194,621 | 3/1980 | Lange | 219/57 |
| 4,213,374 | 7/1980 | Husler | 411/460 |
| 4,714,814 | 12/1987 | Kramer | 219/80 |
| 4,853,511 | 8/1989 | Ritter et al. | 219/58 |

FOREIGN PATENT DOCUMENTS

| | | | |
|---|---|---|---|
| 163306 | 6/1949 | Austria | 411/458 |
| 35 18 811 | 11/1986 | Germany . | |
| 1201449 | 12/1985 | Russian Federation . | |
| 1180687 | 2/1970 | United Kingdom | 411/458 |

*Primary Examiner*—Flemming Saether
*Attorney, Agent, or Firm*—Evenson, McKeown, Edwards & Lenahan, PLLC

[57] ABSTRACT

Method for the manufacture of a nail element comprising a plate-shaped body and one or more elongate elements whereby in accordance with the invention in each case at least one elongate elements is set at an angle relative to the face of the plate-shaped body and brought into contact with it, whereupon heat, for example from electric resistance welding, is generated at the point of contact for melting the material of the elongate elements and the plate-shaped body in order to weld these to each other, so that a nail element may be obtained in a simple manner and inexpensively.

6 Claims, 2 Drawing Sheets

NAIL ELEMENT AND METHOD FOR ITS MANUFACTURE

This is a divisional of application Ser. No. 08/045,875, filed Apr. 15, 1993, now U.S. Pat. No. 5,391,114.

The invention relates to a method for the manufacture of a nail element comprising a plate-shaped body and one or more elongate elements.

Such a nail element serves for fastening together nailable building components such as wooden parts, frames, etc. The known nail element is formed, for example, from a plate-shaped body, from which plate the elongate elements are obtained by partially stamping them out and bending them until they are at an angle relative to the face of the plate. Depending on their intended use, these nails may point from one or two sides of the plate-shaped body. As the occasion arises the plate-shaped body may be provided with a recess round its middle.

There is a nail element known from German patent publication DE-A-3 518 811 whereby the elongate elements are welded in place on both sides of a flat plate. With the invention it is now intended to manufacture in a simpler and less expensive manner the nail element proposed in accordance with that German patent publication.

To this end the method in accordance with the invention is distinctive in that at least one elongate element is set at an angle relative to the face of the plate-shaped body and brought into contact with it, whereupon heat is generated at the point of contact for melting the material of the elongate element and the plate-shaped body in order to weld them together. The elongate elements may then be welded to the lateral edge of the plate-shaped body and, if the plate-shaped body is provided with the recess referred to above, be connected to the lateral edge of this recess at the same time.

Moreover, with the proposed method just one weld is required per elongate element in order to connect to the plate-shaped body two nails projecting from both sides of the plate-shaped body. In a particularly simple embodiment the heat required for bringing about the joint may be generated by electric resistance welding by establishing an electric circuit via the elongate element and the plate-shaped body.

Furthermore, in accordance with the invention it is preferable to obtain the elongate elements from a longer wire which may, for example, be wound off a reel and cut to length. The same may take place by obtaining the plate-shaped body from a longer strip which may be wound off a reel and likewise cut to length. This cutting to length may take place before or after the welding operation.

The invention also relates to a nail element that is obtained by means of the method in accordance with the invention. This nail element differs from the nail element known from DE-A-3 518 811 in that at least one elongate element is placed at a point between its ends against an edge of the plate-shaped element. In particular the lateral edge of the plate-shaped body is concerned here and in a further embodiment a connection to the edge of a recess which may be provided round the middle of the plate-shaped body.

Preferably the ends of the elongate element facing away from the plate-shaped body are bevelled. This bevelling ensures that the elongate element bends as it is forced into the nailable material, so that a greater adhesion may be brought about.

The above and other characteristics are evident from the following description using Figures of two example embodiments.

Figure 1:
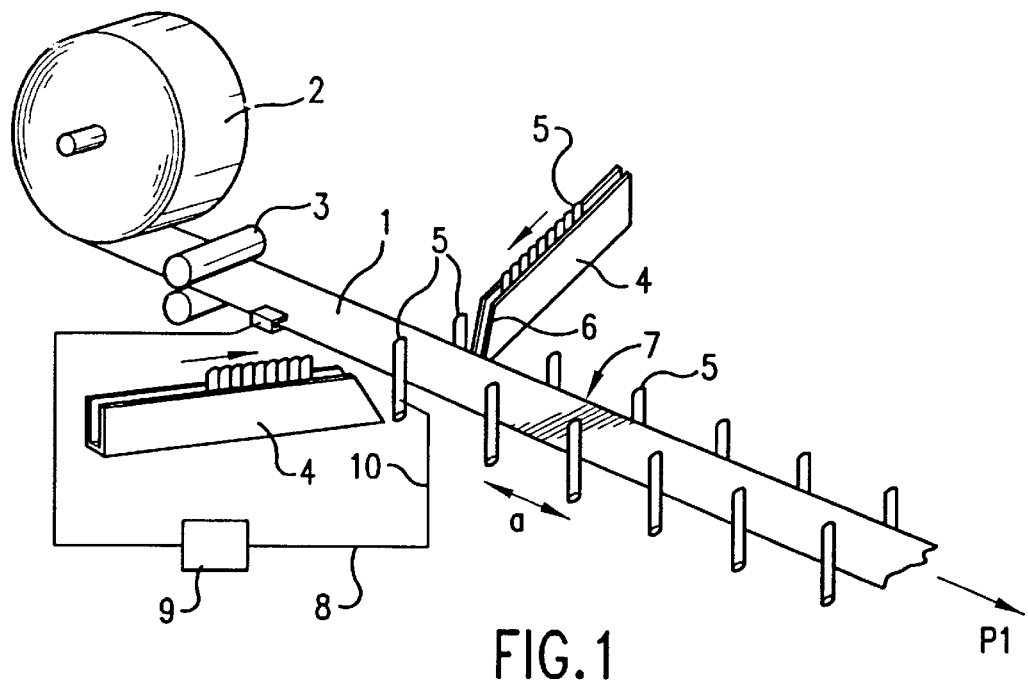
FIGS. 1 and 2 each show a perspective top view of a method for the manufacture of a nail element in accordance with the invention.
Figure 2:
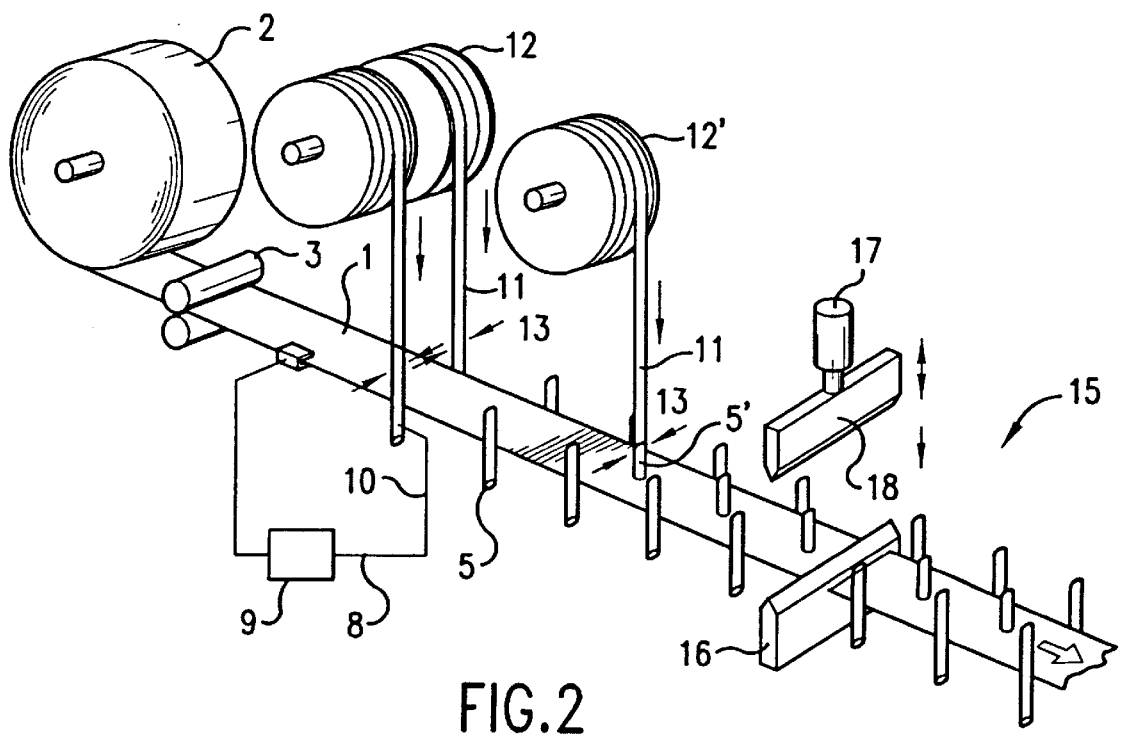

In the Figures the number (1) indicates the plate-shaped body that is obtained in both embodiments of FIGS. 1 and 2 from a long flow of weldable material, for example metal, that is unwound from a reel (2). Unwinding takes place by leading the strip through the pinch of a pair of rollers (3) driven by a means of drive not shown in the drawing in order to advance the strip in the direction of arrow P1.

Figure 3:
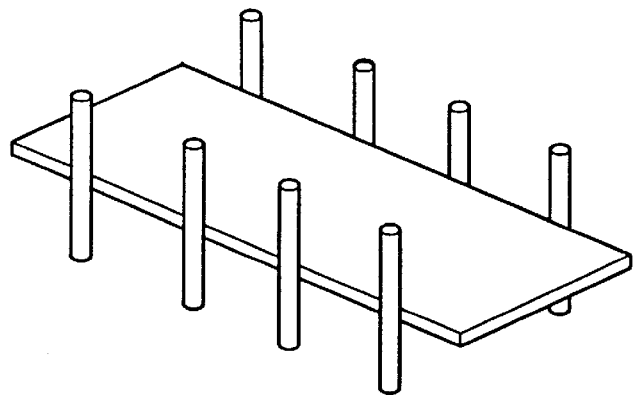
FIGS. 3, 3A and 4 each show a perspective view of the nail element without a recess in the plate-shaped body, fastened to the building components, and with a recess in the plate-shaped body, respectively.
Figure 3A:
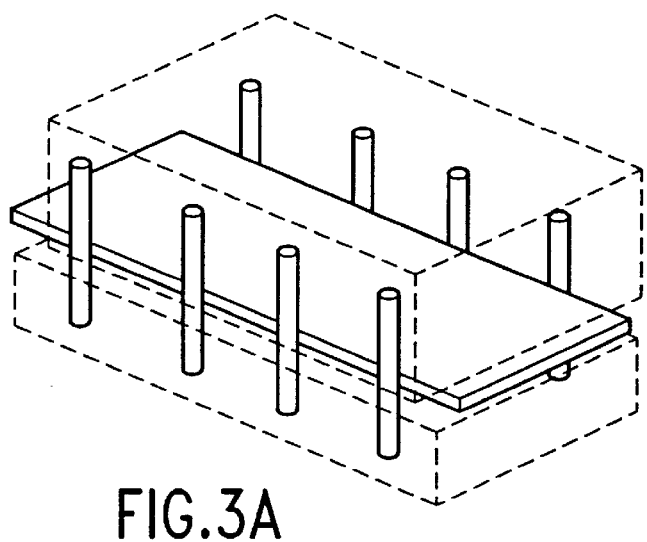

A number of elongate elements are kept stored upright in a pair of holders (4) whereby an end part (6) of the U-shaped holder (4) lies close to the lateral edge (7) of the strip (1). By separating and feeding a elongate element (5) towards the lateral edge (7) on the strip (1), a point of the elongate element (5) may be melted in position onto the lateral edge of the strip (1) by connecting an electric circuit (8). To this end an electric circuit is formed by a source of power (9) which is connected on one hand by the conductors (10) to a elongate element (5) and on the other to the lateral edge (7) of the strip (1). By moving the strip (1) each time in stages over a pass distance (a), the above process may be repeated on one or two edges of the strip (1) so that a strip with nail elements is created as shown to the right of FIG. 1. By cutting the strip (1) to length, elements are obtained which are suitable for fastening together nailable elements, for example wooden building components (FIG. 3a).

It should be noted that the ends of the elongate element (5) are bevelled, whereby the face of the bevelling may be made as required and depends on the desired attachment of the nailable building components. The bevelling ensures a deviation in the initial position of the elongate elements (5) relative to the plate-shaped body (1) as they are driven into the nailable material. Naturally, the end of each elongate element may also be pointed just like a normal nail.

It is also possible for the elongate elements (5) to be composed of a split element whereby the split face runs through the centre of the element (5) so that, as it is driven into the nailable material, the element will tend to yield which likewise improves the adhesion.

Figure 4:
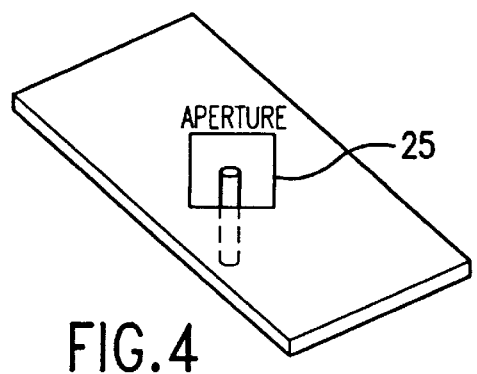

FIG. 2 shows an alternative embodiment for the manufacture of a nail element in accordance with the invention. Here the elongate elements are not fed in via a holder (4) but rather they are obtained from a longer wire (11) which is wound off a reel (12). Cutting through (see arrow 13) the wire (11) creates a elongate element (5) that may be welded in the same manner as in FIG. 1 to the lateral edge (7) of the strip (1). A wire (11) may also be wound off a reel (12'), whereby, every time the wire is cut through, the elongate element (5') is placed on the top of the strip and welded in place by means of an electric circuit. This positioning is of itself known from DE-A-3 518 811. The length of this elongate element (5') may be equal to half that of the elongate rectangular element (5) or greater or smaller. Furthermore in accordance with the invention it is possible to apply plate-shaped material that is provided with recesses 25 (FIG. 4) near the middle of the plate-shaped material in each case at pass distances a. The elongate element ($5^1$) which is wound off reel ($12^1$) may then, in analogous manner as the elongate elements (5) which are wound off reel (12), be welded in place against the edge of the recess (not shown) in such a way that the relevant elongate element (5¹) projects on both sides of the plate-shaped body (1) through the recess 25. This prevents a welded joint from having to be applied on both faces of the plate-shaped body for the same functionality. Cutting through at arrow (13) may take place once again at an incline so that the desired bending off takes place when driven into the nailable material. The final nail element is finished off by cutting off strip 2 in a cutting direction (15), here by means of a fixed bottom knife (16) and a top knife (18) moved by a cylinder (17). The length of the plate-shaped body 1 is dependent on the intended use. Finished nail elements are shown in FIGS. 3 and 4.

It will be clear that the lengths of the elongated elements may differ from one another and that the pass a may be varied between the elongated 5 during the feed-through process.

It is likewise possible for one or more ridges to be made in the plate-shaped body by way of reinforcement after being wound off the reel. Furthermore the plate-like body can be embodied by a wire-netting.

Although the above embodiment relates to the manufacture of a nail element from metal, it may also be manufactured from other materials, for example plastics.

The invention is not limited to the embodiment described above.

I claim:

1. A nail element, comprising:

a plate-shaped body in a strip-form having head end edges and lateral edges;

a plurality of elongated elements, wherein at least a number of said plurality of elongated elements are fixedly secured against each of the lateral edges of the plate-shaped body at a point located between opposite ends of said elongated elements such that said elongated elements sufficiently protrude from opposite surfaces of said plate-shaped body, and together with the plate shaped body, function as the nail element;

wherein said plate-shaped body includes an aperture formed near a middle region of said plate-shaped body, said aperture being sized to exceed a thickness of one of said elongated elements, wherein at least one of said elongated elements is fixedly secured against an edge of said aperture.

2. A nail element according to claim 1, wherein at least one end of said plurality of elongated elements is bevelled asymmetrically.

3. A nail element, comprising:

a plate-shaped body in a strip-form having narrow edges and long lateral edges;

a plurality of elongated elements, wherein at least a number of said plurality of elongated elements are fixedly secured only against the long lateral edges of the plate-shaped body in an original position at a point located substantially midway between opposite ends of said elongated elements such that each of said elongated elements sufficiently protrude from opposite planar surfaces of said plate-shaped body perpendicular to said planar surfaces, wherein the protruding elongated elements on each opposite planar surface function as a fastener for the nail element, with at least one end of said plurality of elongated elements being beveled asymmetrically so as to engage the nailable component at an angle bent from the original position.

4. A building connection comprising:

a nail element which comprises a plate-shaped body in a strip-form having narrow head end edges and long lateral edges, and a plurality of elongated elements, wherein at least three of said plurality of elongated elements are fixedly secured against the long lateral edges of the plate-shaped body in an original position at a point located substantially midway between opposite ends of said elongated elements such that each of said elongated elements sufficiently protrude from opposite planar surfaces of said plate-shaped body perpendicular to said planar surfaces, wherein the protruding elongated elements on each opposite planar surface function as a fastening portion of the nail element, at least one end of said plurality of elongated elements being beveled asymmetrically; and a first building component fastened on one planar side of the plate-shaped body to said asymmetrically beveled ends of the plurality of elongated elements which engage into the first building component at angles bent from said original position.

5. A building connection according to claim 4, further comprising a second building component similarly fastened to opposite ends of the protruding elongated elements on another, opposite, planar side of the plate-shaped body.

6. A nail element, comprising:

a plate-shaped body in a strip-form having narrow edges and long lateral edges;

a plurality of elongated elements, wherein at least a number of said plurality of elongated elements are fixedly secured against the long lateral edges of the plate-shaped body in an original position at a point located substantially midway between opposite ends of said elongated elements such that each of said elongated elements sufficiently protrude from opposite planar surfaces of said plate-shaped body perpendicular to said planar surfaces, wherein the protruding elongated elements on each opposite planar surface function as a fastener for the nail element, with at least one end of said plurality of elongated elements being beveled asymmetrically so as to engage the nailable component at an angle bent from the original position having at least three elongated elements.

* * * * *